June 19, 1951     L. E. LYSTER     2,557,229
FOOT SCRAPER FOR AUTOMOBILES AND THE LIKE
Filed Dec. 16, 1949
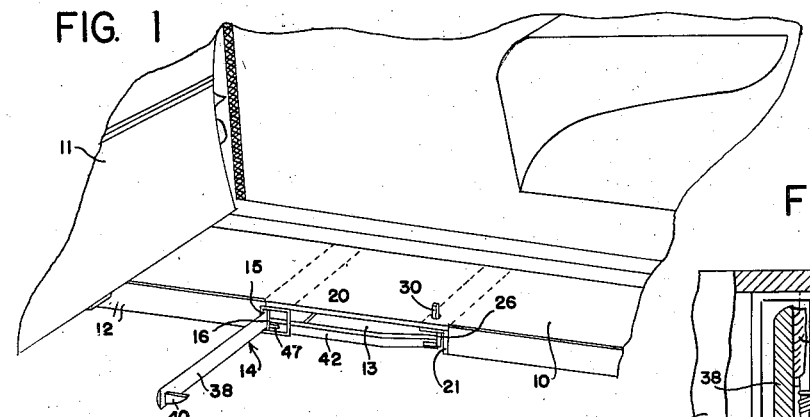
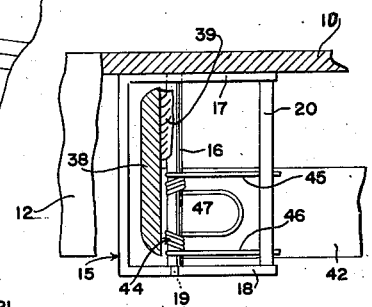
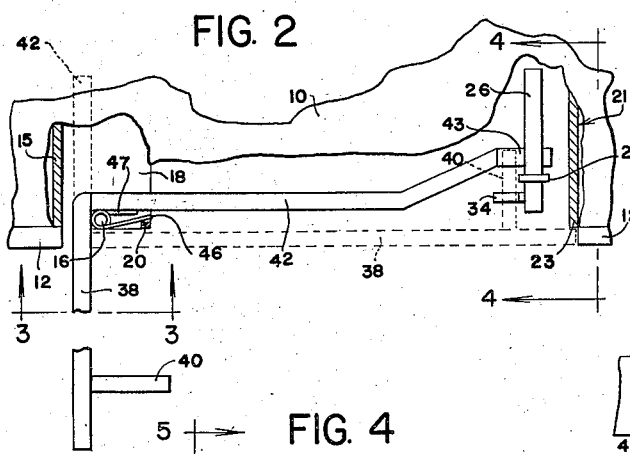
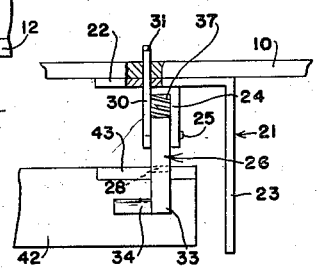
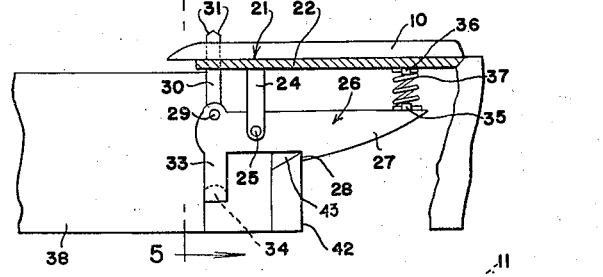
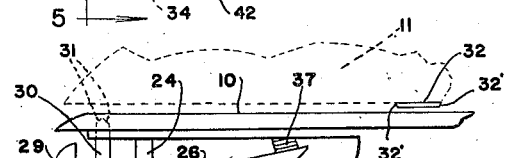
*INVENTOR*
LOUIS E. LYSTER
BY *McMorrow, Berman & Davidson*
*ATTORNEYS*

Patented June 19, 1951

2,557,229

UNITED STATES PATENT OFFICE 2,557,229

FOOT SCRAPER FOR AUTOMOBILES AND THE LIKE

Louis E. Lyster, Las Vegas, N. Mex.

Application December 16, 1949, Serial No. 133,253

2 Claims. (Cl. 280—164)

My invention relates to a foot scraper.

A primary object of my invention is to provide a foot scraper to be mounted upon the running board of an automobile, so that mud, snow and the like may be scraped from the feet before entering the automobile, thereby preventing soiling the floor covering of the automobile and upholstery, as well as deterioration of the metal floor beneath the floor covering.

A further object is to provide a foot scraper for automobiles which is shiftable to an operative position for scraping the feet, and which will return automatically to an inoperative or closed position when the adjacent door of the automobile is closed.

A further important object is to provide a foot scraper of the above-mentioned character which may be used equally well upon automobile having wide, external-type running boards, and those having the narrow or concealed running boards, in either case, the device forming a neat and attractive accessory which blends in appearance with the portion of the automobile adjacent to the point of installation of the device.

A further object is to provide a foot scraper of the above-mentioned type which is highly simplified, compact, sturdy and durable, and cheap to manufacture.

Other objects and advantages of the invention will be apparent during the course of the following description.

In the accompanying drawings forming a part of this application, and in which like numerals are employed to designate like parts throughout the same:

Figure 1 is a fragmentary perspective view of a foot scraper embodying my invention, and showing the same applied to an automobile running board;

Figure 2 is an enlarged fragmentary plan view of the foot scraper illustrated in Figure 1;

Figure 3 is an enlarged, transverse, vertical section taken on line 3—3 of Figure 2;

Figure 4 is a vertical section taken on line 4—4 of Figure 2;

Figure 5 is a vertical section taken on line 5—5 of Figure 4; and

Figure 6 is a view similar to Figure 4, but showing parts in different operative positions.

In the drawings, where, for the purpose of illustration, is shown a preferred embodiment of my invention, the numeral 10 designates a running board of an automobile, and preferably of the concealed type, covered by the bottom edge of the adjacent automobile door 11, when the door is closed. The outer, longitudinal edge of the running board 10 may be equipped with the usual decorative shield or trim 12 of chrome-plated sheet metal or the like. A section of the trim 12 may be cut away, as shown at 13, to accommodate my foot scraper designated generally by the numeral 14.

For mounting my foot scraper 14 upon the running board 10, I provide a horizontal, transverse channel 15, welded, bolted or otherwise rigidly secured to the bottom of the running board 10 and extending transversely inwardly of the trim 12, as shown. Adjacent to the outer end of the channel 15 and slightly inwardly of the trim 12, a vertically extending, rotatable pivot pin 16 is disposed between the top and bottom horizontal webs 17 and 18 of the channel, and this pivot pin 16 includes a bottom reduced extension 19 journaled in a small opening in the web 18. The top end of the pin 16 is journaled in an opening in the web 17, as shown. The pin 16 is freely rotatable, and is held against axial or vertical movement by the web 18 and running board 10. The pivot pin 16 is spaced laterally from the back or vertical web of the channel 15, Figure 3, and adjacent to the outer end of the channel and laterally opposite the pin 16, a vertically disposed rod or bar 20 is arranged, and has its top and bottom ends secured by welding or the like to the webs 17 and 18 of the channel adjacent to the outer, longitudinal edges of such webs, Figure 3.

Spaced longitudinally from the channel 15 and extending parallel thereto and transversely of the running board 10 is a horizontal, transverse support bracket or angle iron 21 including an upper, horizontal web 22, welded, bolted or otherwise rigidly secured to the bottom of the running board 10, as shown. The bracket 21 extends transversely inwardly from the outer edge or trim 12 of the running board. The outer end of the bracket 21, like the outer end of the channel 15, terminates substantially flush with and slightly inwardly of the trim 12 of the running board. Arranged near and slightly inwardly of the outer end of the bracket 21 and rigidly secured by welding or the like to the top flange 22 thereof and spaced from the vertical flange 23 of the mounting bracket is a depending bifurcated support or yoke 24 which is vertically disposed. Arranged between the sides or arms of the yoke 24, and pivotally connected therewith, as shown at 25, adjacent to the bottom of the yoke 24 is a vertically swingable catch element or keeper 26 which is generally horizontal in all operative positions, and which extends transversely of the running board 10 and longitudinally of and parallel to the bracket 21 and channel 15. The keeper 26 is provided at its inner end and upon its bottom edge with an inclined, arcuate face or cam surface 27, for a purpose to be described, and terminating in a vertically disposed locking shoulder 28 arranged substantially at the longitudinal center of the keeper 26. The outer or forward end of the keeper 26 extends substantially adjacent to the forward or outer end of the bracket 21, Figure 4, and pivotally connected with the keeper 26 adjacent to its forward end and near the top of the keeper, as shown at 29, is a vertically reciprocatory latch bolt 30 operating through an opening formed in the top flange 22 and running board 10. The top of the bolt 30 is adapted to project above the top surface of the running board 10, and the top of the bolt is preferably beveled or inclined, upon its inner end and outer sides, as at 31, so that when the door 11 is closed, a strike plate or cam 32 secured to the bottom edge of the door will engage the outer bevel 31 of the bolt for forcing the bolt downwardly, the cam being beveled at its inner and outer side edges 32', as shown. Adjacent to the bolt 30, the keeper 26 is further provided with a depending, vertical lug or extension 33 integral with the keeper, and having secured to its bottom end a transverse, horizontal extension or lug 34, extending away from the vertical flange 23 and toward the channel 15. The bolt 30 is disposed adjacent to the inner side of the keeper 26, Figure 5, or that side of the keeper closest to the channel 15. Adjacent to its inner end, and upon its top, the keeper 26 is provided with a small, upstanding projection or lug 35 rigidly secured thereto by any suitable means, and a companion projection or lug 36 is rigidly secured by welding or the like to the bottom of the horizontal flange 22 and disposed in alignment with the element 35. A compressible coil spring 37 is disposed between the top of the keeper 26 and the flange 22, as shown, and the opposite ends of this spring engage over the lugs 35 and 36 which serve to center the spring. As shown clearly in Figures 4 and 6, the spring 37 is adapted to exert a force upon the inner end of the keeper 26 for pivoting it about the pin 25 of the yoke 24.

An elongated, straight, substantially rigid scraper bar or blade 38 is disposed horizontally, and has its inner end rigidly secured by welding or the like, as shown at 39, to the pivot pin 16 above the longitudinal center of the pivot pin, Figure 3. The scraper bar or blade 38 is thus adapted to swing horizontally with the pivot pin when such pin rotates. The length of the scraper bar 38 is substantially equal to the distance between the channel 15 and angle iron or bracket 21. Near and slightly inwardly of its outer end, the scraper bar 38 is provided upon its inner side with a transversely extending cam 40 having its bottom face upwardly inclined and curved, as shown at 41. The location of the cam 40 is such that when the scraper bar 38 is swung horizontally inwardly to its closed or inoperative position adjacent to the trim 12, the cam 40 will engage the top of the extension or lug 34 to hold the same downwardly, and the cam will be disposed upon the inner side of the depending extension 33, or the side of such extension nearest the channel 15. The scraper bar 38 is relatively thin, and may be rounded or beveled at its top and bottom edges to conform to the contour of the running board trim 12 and to be more effective for scraping mud and the like from the feet. The height of the bar 38 is such that it extends for substantially the entire length of the pin 16 and for substantially the entire distance between the webs 17 and 18, Figure 3.

Rigidly secured to the inner end of the scraper bar 38, and preferably formed integrally therewith and arranged at right angles to the scraper bar, is an elongated, horizontally disposed extension or arm 42 adapted to swing horizontally beneath the running board 10 and having a length substantially equal to the distance between the channel 15 and bracket 21. As shown in Figure 3, the arm 42 is vertically narrower than the scraper blade 38, and the arm 42 extends from the bottom longitudinal edge of the scraper blade to substantially the vertical or transverse center of the scraper blade. The top longitudinal edge of the arm 42 is arranged below the upper portion of the scraper blade 38 which is welded at 39 to the pin 16. The arm 42 is arranged inwardly of the vertical rod 20 and is adapted to swing above the bottom web 18. The free end of the horizontally swingable arm 42 terminates adjacent to the keeper 26 and is adapted to swing beneath the keeper, as will be more fully described. The top edge of the arm 42 adjacent to the keeper 26 and at the free end of the arm is beveled or inclined, as shown at 43, the lowermost portion of the inclined surface 43 being arranged nearest the trim 12 of the running board. The beveled surface 43 is adapted to engage the bottom cam surface 27 of the keeper 26 for lifting the keeper so that the arm 42 may engage behind the locking shoulder 28 when the scraper blade 38 is swung outwardly to its operative position, as shown in Figure 2. The end portion of the arm 42 adjacent to the beveled face 43 may be offset laterally inwardly, Figure 2, to position the beveled face 43 adjacent to the locking shoulder 28 when the arm 42 is swung parallel to the trim 12 of the running board.

A torsion-type spring 44 is mounted upon the pivot pin 16 and has its opposite ends bent to form lateral extensions or arms 45 and 46 engaging upon the inner side of the vertical rod 20. The spring further includes a centrally disposed, laterally extending loop 47 which engages the outer face of the arm 42 and is tensioned for urging the arm 42 inwardly beneath the running board 10. When the arm 42 is latched behind the locking shoulder 28, the spring 44 serves to keep the arm in contact with the locking shoulder 28, Figure 4.

The operation of my foot scraper is as follows:
Assuming that the door 11 of the automobile is open, and it is desired to use the scraper for removing mud or snow from the feet, the scraper bar 38 is grasped and swung outwardly by hand to its position shown in Figure 2, wherein the scraper bar 38 is arranged at right angles to the trim 12 of the running board. Since the door 11 is open, the bolt 30 is free to project above the top of the running board 10 and the spring 37 forces the inner end of the keeper 26 downwardly to its position shown in Figure 4. When the scraper bar 38 is swung outwardly, the arm 42 is likewise swung to its position of Figure 2, wherein it is substantially parallel to and adjacent to the trim 12 of the running board. The beveled surface 43 of the arm 42 engages the curved cam face 27 of the keeper 26 and elevates the keeper so that the arm 42 may become locked behind the locking shoulder 28, as shown in Figure 4. The loop 47 of the spring 44 at all times urges the arm 42 inwardly beneath the running board, and accordingly, the loop 47 maintains the arm 42 in positive contact with the locking shoulder 28, while the scraper bar 38 is in the operative position. The scraper bar 38 is thus locked by the keeper 26 in the outwardly extended position of Figure 2, so that the scraper bar may be used for removing mud, snow or the like from the feet of the passengers before they enter the automobile.

When the passengers of the automobile have used the scraper bar 38 and enter the automobile, closing the door 11 behind them, the strike plate 32 carried by the bottom edge of the door engages the outer bevel 31 of the bolt 30 and shifts the bolt 30 downwardly below the top surface of the running board 10. This action pivots the inner end of the keeper 26 upwardly, Figure 6, compressing the spring 37 and elevating the locking shoulder 28 for releasing the arm 42 from behind the locking shoulder. As soon as this occurs, upon the shutting of the door 11, the spring 44 forces the arm 42 to swing horizontally inwardly beneath the running board, and the scraper bar 38 likewise swings horizontally inwardly to its closed or inoperative position, wherein it lies adjacent to and forms substantially a part of the running board trim 12. As the scraper bar 38 swings to the closed or inoperative position, parallel to the running board 10, its cam 40 will engage above the lateral extension 34 of the keeper 26 for holding the keeper inclined, Figure 6, with the outer end of the keeper lowered for retracting the bolt 30 while the door 11 is closed. When the door is again opened, and it is desired to use the foot scraper, the scraper bar 38 is swung to the open position, Figure 1, by hand. This releases the cam 40 from above the extension 34, allowing the keeper 26 to return to the horizontal position, Figure 4, with the bolt 30 projecting upwardly above the top of the running board. Accordingly, the inner end of the keeper having the cam surface 27 and locking shoulder 28 is lowered, and as the arm 42 swings parallel to the trim 12 of the running board, the beveled edge 43 of the arm 42 will contact the cam surface 27 of the keeper and the arm 42 will again engage behind the locking shoulder 28 for holding or locking the scraper bar 38 in the outer operative position.

In the event of only a partial closing of the scraper bar 38, the cam 40 may not completely retract the bolt 30 while the door 11 is closed. If this occurs, the door 11 may still be opened, since the outer bevel 32' will coact with the inner bevel 31 of the bolt to depress the bolt, so that the strike plate 32 may pass.

The device is highly simplified, compact and very strong. It may be installed equally well upon automobiles with the modern, concealed-type running boards, or upon those having the older, external-type, wide running boards. All that is required in this respect is that the bolt 30 be long enough to be engaged by the bottom edge of the door when the same is closed for releasing the arm 42 so that the spring 44 may swing the scraper bar 38 closed automatically. Whenever the door 11 is closed, if the scraper bar 38 should be pulled outwardly accidentally, or otherwise, the spring 44 will cause it to return automatically to the closed or inoperative position.

I prefer to make certain parts of the device, such as the pin 16, scraper bar 38, arm 42, keeper 26, cam 40 and springs from non-corrosive material, such as stainless steel or from ordinary steel which is chrome plated.

As previously stated, the scraper bar 38 may be shaped to conform to the contour of the running board trim 12, or any other part of the automobile adjacent to which it is mounted, and obviously, the bar 38 may be painted to blend with any adjacent part of the automobile or running board. It should be mentioned that the scraper bar 38 is substantially self cleaning, for when the strong spring 44 swings the scraper bar automatically to the closed position, it strikes the running board 10 with a considerable impact, and most of the mud or snow will thus be jarred from the scraper bar. If desired, a suitable, depending, transverse mud shield, not shown, may be mounted vertically beneath the running board 10 adjacent to and parallel with the outer or closed side of the channel 15, so that mud or other foreign material thrown up by the front wheels will not come into contact with the working elements of the device associated with the channel 15.

While I have stated that the scraper bar 38 is swung outwardly to its operative position by hand, I do not wish to limit the invention to manual opening of the scraper bar. If desired, the scraper bar 38 may be opened by power from the automobile storage battery, or the like, and additional mechanism may be applied to thus operate the scraper bar.

It is to be understood that the form of my invention herewith shown and described is to be taken as a preferred example of the same, and that various changes in shape, size and arrangement of parts may be resorted to without departing from the spirit of the invention or the scope of the appended claims.

Having thus described my invention, I claim:

1. A foot scraper for an automobile including a running board and a door adapted to swing over the running board, comprising a horizontally swingable scraper bar pivotally mounted upon the running board and adapted to extend transversely outwardly of the running board at substantially right angles thereto, an arm secured to the scraper bar adjacent to its inner end and adapted to swing horizontally beneath the running board when the scraper bar swings, a latch device secured to the bottom of the running board and spaced longitudinally of the scraper bar, the latch device being arranged in the path of travel of the arm, the latch device engaging the arm for locking the scraper bar in the operative position, substantially at right angles to the running board, and mechanical means connected with the latch device and projecting above the top of the running board for engagement with the bottom edge of the door when the same is closed for releasing the arm so that the scraper bar may be swung to an inoperative position substantially parallel with the running board.

2. A foot scraper for an automobile including a running board and a door swingable over the top surface of the running board, comprising a support secured to the bottom of the running board and extending transversely thereof, a vertically disposed pivot pin rotatably mounted upon the support, a horizontally swingable elongated scraper bar secured to the pivot pin for rotation therewith and adapted to extend transversely of the running board and substantially at right angles thereto, an elongated arm secured to the inner end of the scraper bar and extending substantially at right angles to the scraper bar and adapted to swing horizontally beneath the running board, a spring connected with the pivot pin and support and engaging the arm for urging the arm inwardly beneath the running board to swing the scraper bar toward a closed inoperative position substantially parallel with the running board, a pivoted latch element secured to the bottom of the running board and spaced longitudinally of the support and arranged in the path of travel of the outer end of the arm and having a locking notch receiving the arm for locking the scraper bar in the operative position substantially at right angles to the running board, and a vertically reciprocatory bolt connected with the latch element and projecting above the top surface of the running board for engagement with the bottom edge of the door when the door is closed, the bottom edge of the door depressing the bolt and pivoting the latch element upwardly for releasing the arm from the locking notch so that the spring may swing the scraper bar automatically to the inoperative position substantially parallel to the running board.

LOUIS E. LYSTER.

REFERENCES CITED

The following references are of record in the file of this patent:

UNITED STATES PATENTS

| Number | Name | Date |
| --- | --- | --- |
| 817,171 | Hibner | Apr. 10, 1906 |
| 1,227,218 | Terry | May 22, 1917 |
| 1,619,404 | Crowe | Mar. 1, 1927 |
| 1,652,312 | Lewis | Dec. 13, 1927 |